Feb. 26, 1935.   O. A. LABUS   1,992,669
APPARATUS FOR TREATMENT OF VERMICULITE
Filed Oct. 25, 1933   2 Sheets-Sheet 1

Patented Feb. 26, 1935

1,992,669

UNITED STATES PATENT OFFICE 1,992,669

APPARATUS FOR TREATMENT OF VERMICULITE

Otto A. Labus, Wisconsin Rapids, Wis.

Application October 25, 1933, Serial No. 695,209

9 Claims. (Cl. 263—27)

My invention relates to heaters or furnaces and concerns more particularly appliances of this general character adapted for the heat treatment of minerals, especially those of the vermiculite group, whereby to bring about their exfoliation or enlargement, thus processing them to a condition which especially adapts them, because of their highly cellular form, for use as heat insulation media, such as may be employed to advantage in the walls, roofs and floors of buildings, although they are also well qualified for other satisfactory uses.

To effect the desired puffing, swelling or distension of the mineral particles to maximum advantage and effect, it is well to preheat the granules to bring about the serviceable exfoliation throughout the entire masses of the particles.

If the micaceous mineral pieces are quickly heated to exfoliation temperature, a change takes place throughout their surfaces, due to chemical modification incident to the expulsion of the water of crystallization of constitution, which acts as a distinct resistance to the heat reaching the hearts of the particles with the result either that maximum enlargement does not occur, or, if it is accomplished, the outer surface layers of some of the particles or the entire bodies of other particles will have been overheated enough to render them objectionably friable or easily crumbled.

Accordingly, it has been found to be of substantial benefit, both as to the product attained and as to the method employed, to first heat the mineral pieces at a low temperature gradient sufficient only to expel the free and adsorbed moisture, whereby all particles will be of the same temperature in every part and with the specified moisture eliminated, whereupon the mineral mass is directly subjected to a relatively-high temperature to effect the desired exfoliation or enlargement of the mineral pieces incident to the chemical change or transformation brought about by the expulsion of the water of crystallization.

This invention, therefore, pertains to an improved and novel heating furnace having the needed structural and functional characteristics for performing the stated process with effectiveness, efficiency and economy.

It is recognized that equipment for heat treating vermiculite is not new and has heretofore taken form in substantially two types of appliances, the one class known as a calcining furnace or the indirect heating device, the other or second style of apparatus constituting the direct fired type in which the vermiculite is brought into contact with the gases of combustion.

However, in these structures the vermiculite has been subjected directly to the high temperatures at which transmutation takes place, but as the interval of contact between the vermiculite and the heating element is of great importance in the production of transmuted or exfoliated vermiculite for good insulating qualities, it is not possible to maintain accurately the correct time interval or temperature, since vermiculite has a substantial affinity for water vapor hygroscopically as well as that moisture held by adsorption, both of which are variables in the ore as it is mined.

The heat required to drive off these moisture contents and to raise the temperature of the mineral to transmutation or exfoliation degree being changeable and uncertain, the generally used types of heat-treating appliances do not produce a reasonably uniform product due to the fact that it is likely to be either partly overheated causing it to be more or less objectionably friable, or partly insufficiently heated under which conditions the maximum exfoliation is not attained.

In general, it may be stated that one of the leading objects of this invention is the production of a heat treating furnace incorporating features particularly desirable in the production of a stable, highly cellular or spongy formation of low heat conductivity material suitable as a heat insulating medium.

In order that those skilled in this art may understand a present, preferred embodiment of the invention, in the associated drawings to which reference should be had in connection with the following detailed description of the structure and mode of operation of the apparatus, such an appliance has been suitably illustrated, and for simplicity like reference numerals have been employed to designate the same parts in the views.

In the drawings:—

Figure 1:
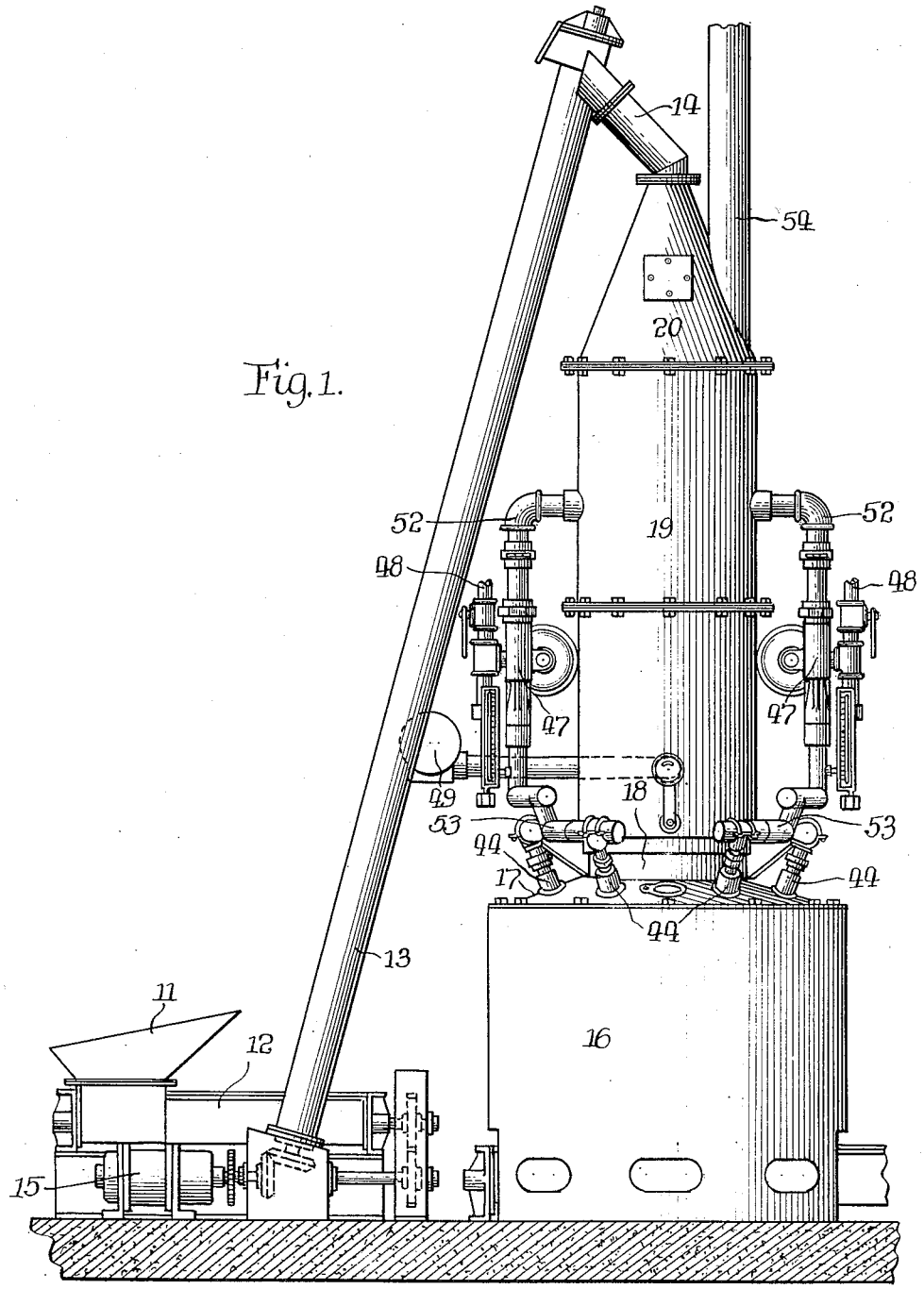
Figure 1 is an elevation of the furnace.

Referring to such drawings, it will be observed that the new appliance includes a hopper 11 by means of which suitable granules of raw mineral are introduced into a screw-conveyor 12 which in conjunction with an inclined screw-conveyor 13 and its discharge-conduit 14 delivers the mineral into the top of the heater proper.

These conveyors or feeders may be operated by an electric motor 15, the speed of which can be readily controlled to govern the rate at which the mineral is fed into the furnace.

Figure 2:
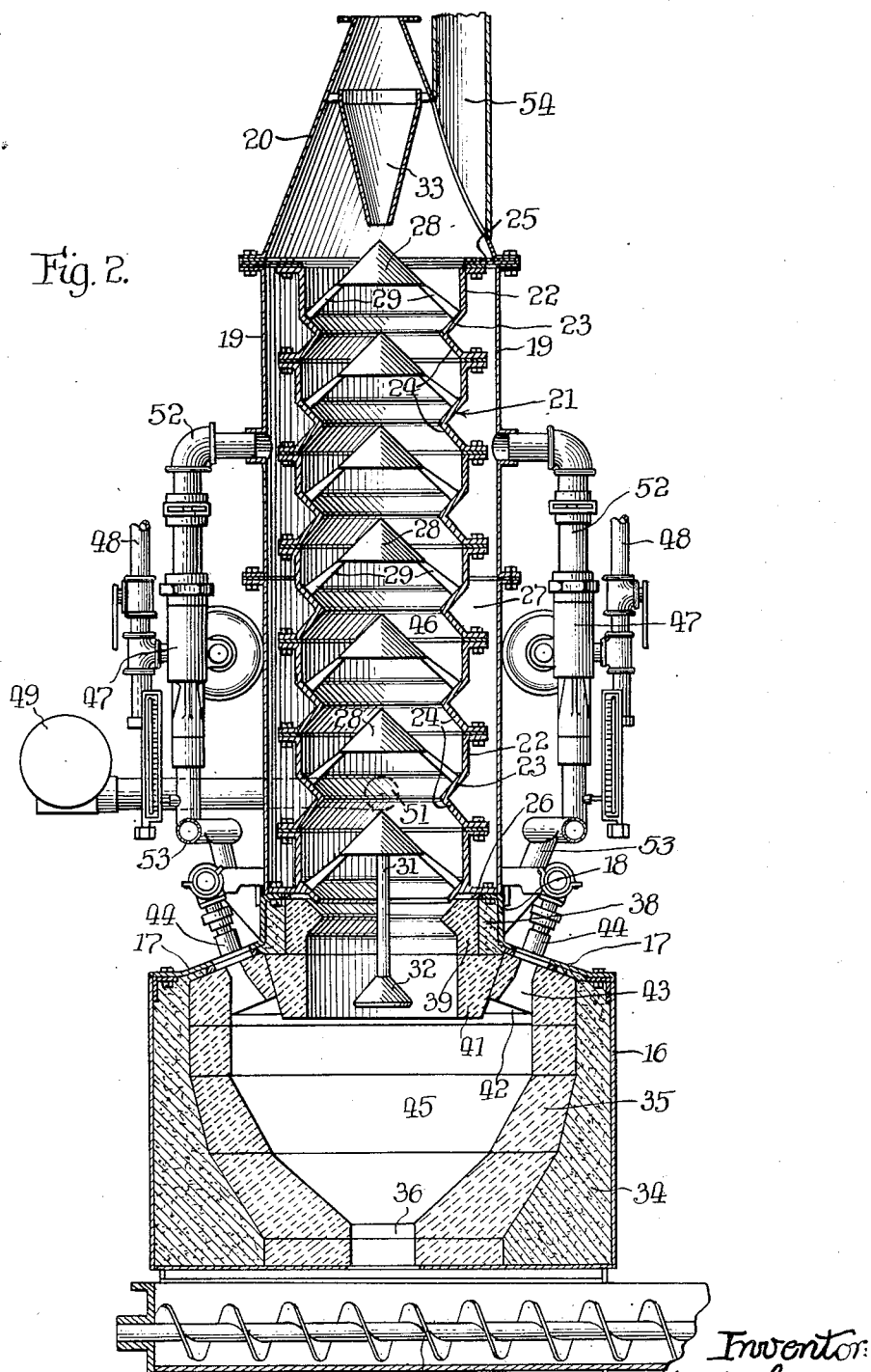
Figure 2 is a central, vertical section through the furnace with some of the parts shown in full lines and with the whole figure on a scale somewhat larger than that of Figure 1.

As is presented in Figure 2, the appliance includes an outer, metal shell or casing comprising a larger, cylindrical, lower section 16, an intermediate, tapered portion 17 merging into a smaller, cylindrical part 18, a cylindrical section 19, and an upper, conical member 20 into the open top of which the mineral is introduced by the means referred to above.

The relatively-tall section 19 of the casing accommodates within it a concentric, sectional, metal lining or wall 21 of somewhat corrugated formation having vertically-spaced parts 22 with inwardly, downwardly, converging sections 23 at their lower margins, and outwardly flaring portions 24 joining the lower edges of the parts 23 with the top margins of the sections 22, all as is clearly illustrated.

This inner wall may be conveniently built up of horizontal sections resting on one another and bolted or riveted together by means of suitable flanges.

The top and bottom of such internal shell or wall are connected in any approved manner by corresponding walls 25 and 26 with the external casing member 19, thereby providing a closed jacket or space 27 between the two members 19 and 21.

As is clearly presented in the drawings, each inclined or sloping surface 23 supports a cone-baffle 28 by means of its legs 29 resting thereon, these cones or baffles constituting a tier or series one above another and all centrally located inside of the member 21, the lowermost cone of such group by means of a central support 31 carrying below it a somewhat-smaller, distributing cone 32 located in the center of the top of the lower enlarged portion of the furnace.

In order to direct the incoming mineral mass on to the apex of the topmost cone 28, the portion 20 of the casing is internally equipped with a centrally-located, appropriately-supported, stationary funnel or guide 33 through which the mineral passes in its descent to the tier of cones.

From what precedes, it will be easily understood that the mineral mass delivered into the heater passes through the funnel 33 on to the center of the uppermost cone baffle down which it slides in a thin stream or layer in a diverging path on to the adjacent reversely-inclined surface 23 which reassembles it in a measure and directs it inwardly on to the next lower cone which distributes it outwardly again on to the next surface 23, and so on.

Thus the mineral mass uninterruptedly flows down through this baffle-fitted portion of the furnace, which constitutes its preheating section, and it is properly agitated and successively spread out in thin streams after having been each time brought together more intimately between such dispersions.

Upon leaving the bottom cone 32 the preheated material is appropriately distributed by such element in the high-heat combustion chamber of the appliance inside of the part 16 of the casing.

Such portion 16 is lined with heat-insulating material 34 and this is lined in turn with refractory blocks or bricks 35 of such form and shape as unitedly to provide an inner surface converging downwardly to a bottom exit 36 through which the finished product is discharged into a screw-conveyor 37 which delivers it out of the furnace.

Parts 17 and 18 are lined with additional insulation 38 and refractory blocks 39, as shown, to provide a depending curtain wall 41 forming an annular chamber 42 connected by spaced passages 43 with a corresponding number of fuel burners 44, six being used in the present instance.

From an inspection of the drawings it will be seen that the burners and consequently the flames therefrom are downwardly and inwardly directed and that the circular wall 41 prevents the descending, entering, spreading, mineral material from coming into contact with the burners or directly with their flames.

Stated somewhat differently, it is desirable and feasible to have the burners so positioned or located as to avoid contact of the mineral during its transmutation or transformation with the flames of the heat-generating means or burners, and to this end the reserved or protected space 42 is employed through which the flames are admitted downwardly into the combustion chamber, thus avoiding direct contact between the mineral and the burning fuel, as it has been found to be undesirable to have the mineral contact directly with the flames as a regenerative heat occurs causing a fusion of the minerals resulting in the clogging of the burner openings, and also other difficulties hinder the efficient performance of such devices where this condition is not provided for.

Such lower, high-heat combustion-chamber has been designated as a whole 45, whereas the preheating compartment or passage has been denominated 46.

Gas, oil, pulverized coal, or other suitable fuel may be used at the burners to heat the furnace, and, in fact, electrically generated heat may be employed, if preferred, but, in the present instance, gas or liquid fuel flows to two mixers 47, 47 through fuel-inlet pipes 48, 48, air being forced through such mixers and to the burners by a blower 49 of conventional design which feeds the air through an inlet 51 into the lower part of the jacket 27 from an upper section of which it passes through a pair of outlet-pipes 52, 52 to the fuel and air mixers or carburetors 47, 47.

From such mixers, the fuel and air mixtures flow through appropriate manifold piping-systems 53, 53 to the burners.

At the top of the apparatus a stack or chimney 54 is connected to the shell 20 for the escape of the heated products of combustion which flow upwardly from the chamber 45 through passage 46 into the member 20.

The continuous, but retarded or delayed, flow of mineral pieces or granules by gravity down the barrier-furnished, preheating-chamber encounters the counterflow of upwardly-traveling combustion gases while the mineral is spread out in thin layers, the gases entering the bottom of such chamber being at about 700° Fahrenheit and leaving the top of such chamber at approximately 300° Fahrenheit or less.

In this manner the mineral particles are all gradually heated to a temperature somewhere between 212° Fahrenheit and 300° Fahrenheit, say, for example, 275° Fahrenheit, which heating effects the driving off of practically all of the free and adsorbed moisture of all of the pieces, which of course will necessarily vary somewhat in size, but in this preheating chamber there is no chemical change or transmutation in the mineral.

The rate of feed of the mineral to the heater may, obviously, be changed or regulated, as occasion requires, by modifying the speed of operation of the motor 15, and, of course, the speed of action of the delivery conveyor would be correspondingly controlled.

In ordinary practice, any vermiculite particle completes its descent through this preheating chamber in a few seconds, say three or four seconds, and will have lost weight to an extent or degree corresponding to the amount of moisture driven off during such transit.

The temperature of the gases in the main combustion-chamber 45 may range in its different portions from about 700° Fahrenheit to 2000° Fahrenheit, and the preheated mineral in passing into such relatively hot chamber is immediately transformed into an enlarged or swelled, more or less spongy, product due to its transmutation occasioned by the elimination and expulsion of its water of crystallization.

Ordinarily, about a second and a half of time is occupied by any particle passing through the chamber 45 and into the conveyor by which it is removed from the apparatus.

In general, in such treatment of the vermiculite about 28% of the heat is consumed in the preliminary treatment of the mineral, approximately 60% is employed in its transmutation, and in the neighborhood of 12% is lost.

The desirable, relatively sudden drop in the temperature of the gases at the top of the main combustion-chamber 45 is caused by the heat required to transmute the mineral by which its exfoliation is accomplished.

As will be readily comprehended, the preheating chamber is prevented from becoming overheated by the constant passage of the heat-absorbing mineral and also by the cooling effect of the air flowing through its encasing jacket, the heating of the air in this manner for use in the burners constituting a desirable economic result in the operation of the apparatus.

From an understanding of the construction and mode of operation of this furnace it will be clear that by the employment of the preliminary heating chamber there is a uniform separation of the mass of mineral granules which become thoroughly intermingled with the hot flue gases ascending in a countercurrent manner through such chamber, thereby obtaining advantageous results of uniform and thorough preheating of the mineral granules throughout their entire mass at a comparatively low heat gradient.

Furthermore, it will be observed that this device, to which the granulated mineral of the vermiculite group is supplied for transmutation, provides suitable means for introductorily or initially thermally preparing the mineral at a low temperature gradient to expel the free moisture held hygroscopically as well as that held by adsorption common to some of the minerals to be treated, thus reducing the inequalities of the heat demand for exfoliation under conditions resulting in a maximum distension or swelling per unit of ore treated, as well as a reduction in the time element with which the ore masses are in contact with the gases at high temperatures.

Those acquainted with this art will readily understand that the invention as defined by the appended claims is not limited to the details of structure or mode of operation presented and that many changes may be resorted to without departure from the essence of the invention and without the loss of any of its material benefits.

An outstanding feature of the invention resides in the manner in which the burners project their hot products of combustion into the lower heating chamber, such gases flowing first downwardly in the same general direction as the travel of the mineral pieces through such chamber and then upwardly through the mineral mass.

The substantial heat required for the transmutation or exfoliation of the mineral in the lower chamber reduces the temperature of the gases passing upwardly into the upright preheating conduit sufficiently so that they are in proper condition to perform the preliminary heating of the incoming mineral at practically the desired temperature, the required drop in temperature of such gases in the preliminary heating conduit being aided by the cooling effect thereon of the air flowing through the encasing jacket.

Furthermore, inasmuch as the furnace or heater is substantially closed or sealed, the gases of combustion supplemented by the steam developed by the driving off of the moisture and water referred to provide a desired practically non-oxidizing atmosphere in which the mineral heating occurs, thus facilitating the production of a plastic as distinguished from a friable product.

I claim:

1. In an upright two-stage heating vermiculite-transmutation furnace, the combination of a main lower high-temperature-gradient transmutation heating-chamber having means to discharge the treated mineral from the lower portion thereof, an upright metal low-temperature-gradient baffled preheating-conduit above said chamber and opening at its bottom into the top portion of said chamber for the gravity delivery of the preheated mineral in said conduit into said chamber through which it falls in the form of a shower, a series of fuel-burners arranged around the upper portion of said chamber and directing their flames downwardly and inwardly into said chamber nearly parallel to the direction of travel of the mineral in the chamber, the products of such combustion reversing their direction of travel and passing up from said chamber through said conduit, means for the escape of the products of combustion at the upper portion of said conduit, means to feed the vermiculite to be treated into the upper portion of said conduit, the baffled characteristic of said conduit retarding the descent of the vermiculite therethrough and spreading the mineral out for efficient contact with the products of combustion, means in said chamber to prevent the mineral passing therethrough from contact with said burners and the flames thereof directly as they issue from said burners, a casing surrounding said conduit and forming an encasing hollow jacket therewith, and means to pass cooling air through said jacket.

2. The structure presented in claim 1 in combination with means to conduct the air from said jacket to said burners to participate in the fuel combustion thereat.

3. The structure presented in claim 1 in which to provide the baffled characteristic of the conduit, the metal wall of said conduit is corrugated to form vertically-spaced inverted truncated-cone surfaces, in combination with a series of vertically-spaced cone-baffles centrally supported in said conduit, said cone-baffles and surfaces being located so that each such cone-baffle distributes the vermiculite in a diverging path onto the corresponding surface of the conduit and each such surface delivers the vermiculite inwardly in a converging manner onto the next lower cone-baffle.

4. The structure presented in claim 1 in which to provide the baffled characteristic of the conduit the metal wall of said conduit is corrugated to form vertically-spaced inverted truncated-cone surfaces, in combination with a series of registering vertically-spaced cone-baffles having feet individually supporting them on said conduit surfaces, said cone-baffles and surfaces being located so that each such cone-baffle distributes the vermiculite in a diverging path onto the corresponding surface of the conduit and each such surface delivers the vermiculite inwardly in a converging manner onto the next lower cone-baffle.

5. In a vertical two-stage vermiculite transmutation furnace, the combination of a multi-tubular combined air preheating and vermiculite preheating heat-exchanger, a vermiculite feeding means associated with the upper portion of said exchanger, a frusto-conical transmutation chamber below, concentric with and communicating with said combined preheating exchanger, a conveying means associated with the lower portion of said transmutation chamber, and a plurality of heat generating means positioned concentrically about the axis of said transmutation chamber and associated therewith from a common plane above the enlarged portion thereof, said heat-generating means being common to the primary heating stage within said combined heat-exchanger and the secondary heating stage within said transmutation chamber.

6. The structure presented in claim 5 in which said combined heat-exchanger has a corrugated air-tight metal inner wall, in combination with a plurality of superimposed centrally positioned vermiculite velocity hindering means supported by said corrugated inner wall.

7. In a vertical two-stage vermiculite transmutation furnace, the combination of a high-temperature secondary heating stage frusto-conical transmutation chamber forming the lower portion of said furnace, a combustion chamber annular recess at the upper enlarged portion of said transmutation chamber and formed by a continuation of the frust-conical wall of said transmutation chamber, a plurality of fuel burners concentrically and downwardly directed from a common horizontal plane above said annular combustion recess, a material outlet centrally located at the lower portion of said high-temperature transmutation chamber, a conveying means associated with said outlet, a multi-tubular heat exchanging primary heating stage means concentric with and supported by said high-temperature transmutation chamber and having an air-tight outer cylindrical casing and an air-tight inner corrugated wall forming an annular fluid passage therebetween, said corrugated wall affording radiating surfaces to said fluid passage, a plurality of velocity hindering means centrally located superimposed within said inner corrugated wall and supported thereby, an air circulating means tubularly connected with said fluid passage and said plurality of fuel burners.

8. In a vertical two-stage vermiculite transmutation furnace, the combination of a high-temperature transmutation chamber, a low-temperature multi-tubular heat transferring means surmounting, concentric with, and communicating with said transmutation chamber, a heat-generating means common to said high-temperature transmutation chamber and said multi-tubular heat transferring means, said heat-generating means emitting gases of combustion from tuyères concentrically spaced and surrounding the upper portion of said transmutation chamber, said gases being delivered into an annular recess combustion space in the upper portion of said transmutation chamber from which the gases travel downwardly in a direction generally parallel to the direction of travel of the material undergoing transmutation at a high-temperature gradient in said chamber and then subsequently upwardly directed through said multi-tubular heat transferring means in a countercurrent manner to the material undergoing heating at a low-temperature gradient therein.

9. In an appliance of the character described the combination of a vertical multi-tubular low-gradient heat-exchaning means comprising an outer cylindrical casing, an air-tight inner corrugated wall, means connecting said outer casing and said wall to form an air-tight annular fluid chamber between said casing and wall, a fluid inlet at the lower portion of said casing, a fluid outlet at the upper portion of said casing, means to circulate a fluid through said inlet, fluid chamber and outlet, a plurality of fuel burners connected to said outlet, a high-temperature transmutation chamber having a restricted outlet at its lower central portion, an inlet at the upper central portion of said transmutation chamber, an annular combustion chamber surrounding said transmutation chamber inlet, said plurality of fuel burners associated with tuyères concentrically disposed and downwardly directed to cause the gases of combustion to first flow downwardly in a direction generally parallel to the direction of travel of the material undergoing treatment and then in a counter-current flow thereafter in an upward manner through a baffled central passageway in the corrugated inner wall of said multi-tubular heat-exchanger, an outlet at the upper portion of said multi-tubular heat-exchanger, and an inlet funnel centrally positioned within said outlet passage at the upper portion of said heat-exchanger.

OTTO A. LABUS.